(12) United States Patent
Ishikawa et al.

(10) Patent No.: US 7,567,736 B2
(45) Date of Patent: Jul. 28, 2009

(54) WAVEGUIDE TYPE WAVELENGTH DOMAIN OPTICAL SWITCH

(75) Inventors: Hiroshi Ishikawa, Tsukuba (JP); Toshifumi Hasama, Tsukuba (JP); Masahiko Mori, Tsukuba (JP); Hisato Uetsuka, Hitachi (JP)

(73) Assignees: National Institute of Advanced Industrial Science and Technology, Tokyo (JP); Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/153,975

(22) Filed: May 28, 2008

(65) Prior Publication Data
US 2008/0298738 A1    Dec. 4, 2008

(30) Foreign Application Priority Data
May 29, 2007    (JP)    ............... 2007-142159

(51) Int. Cl.
G02B 6/26    (2006.01)
(52) U.S. Cl. ............... 385/15; 385/1; 385/2; 385/3; 385/16
(58) Field of Classification Search .......... 385/15, 385/16, 1, 2, 3
See application file for complete search history.

(56) References Cited

U.S. PATENT DOCUMENTS 6,895,158 B2 * 5/2005 Aylward et al. ............ 385/133
7,088,882 B2   8/2006 Ducellier et al.
2005/0002600 A1   1/2005 Ducellier et al.
2006/0067611 A1   3/2006 Frisken et al.

FOREIGN PATENT DOCUMENTS

JP    A-2006-106769    4/2006
WO    WO 2007/029260 A2    3/2007

OTHER PUBLICATIONS

Japanese Office Action dated Apr. 14, 2009 (with English translation).

* cited by examiner

*Primary Examiner*—Jennifer Doan
(74) *Attorney, Agent, or Firm*—McGinn IP Law Group PLLC (57) ABSTRACT

A waveguide type wavelength domain optical switch includes an input/output port including at least three waveguide spectrometers stacked in thickness direction, a first lens for collecting light outputted from an input port of the input/output port in one axis direction, a second lens for collecting light outputted from the first lens in a direction orthogonal to the collecting direction of the first lens, and an optical phase modulation cell for reflecting light outputted from the second lens through the second lens and the first lens to an output port of the input/output port. Alternatively, the input/output port may include at least two waveguide spectrometers and a waveguide optical coupler circuit stacked in thickness direction.

20 Claims, 11 Drawing Sheets

6 OPTICAL PHASE MODULATION CELL
39 CELL

| 3 INPUT/OUTPUT PORT |
| 2c INPUT PORT |
| 2a, 2b, 2d, 2e OUTPUT PORT |
| 7 OPTICAL FIBER |
| 25 FIBER BLOCK |
| 43 DUMMY SUBSTRATE |

FIG.6B $Ng \cdot \sin \theta 1 = No \cdot \sin \theta 2$ ···· EQUATION 1

[No: REFRACTIVE INDEX OF AIR
Ng: GROUP REFRACTIVE INDEX OF WAVEGUIDE]

FIG. 7

2 WAVEGUIDE SPECTROMETER
4 FIRST LENS
5 SECOND LENS
6 OPTICAL PHASE MODULATION CELL
91 SLAB WAVEGUIDE
92 OUTPUT WAVEGUIDE
93 WAVEGUIDE OPTICAL COUPLER CIRCUIT
94 COLLECTING LENS
95 LIGHT-RECEIVING DEVICE

2 WAVEGUIDE SPECTROMETER
4 FIRST LENS
5 SECOND LENS
6 OPTICAL PHASE MODULATION CELL
93 WAVEGUIDE OPTICAL COUPLER CIRCUIT
94 COLLECTING LENS
95 LIGHT-RECEIVING DEVICE

WAVEGUIDE TYPE WAVELENGTH DOMAIN OPTICAL SWITCH

The present application is based on Japanese patent application No. 2007-142159 filed on May 29, 2007, the entire contents of which are incorporated herein by reference.

BACKGROUND OF THE INVENTION

1. Field of the Invention

This invention relates to a waveguide type wavelength domain optical switch.

2. Description of the Related Art

Figure 10:
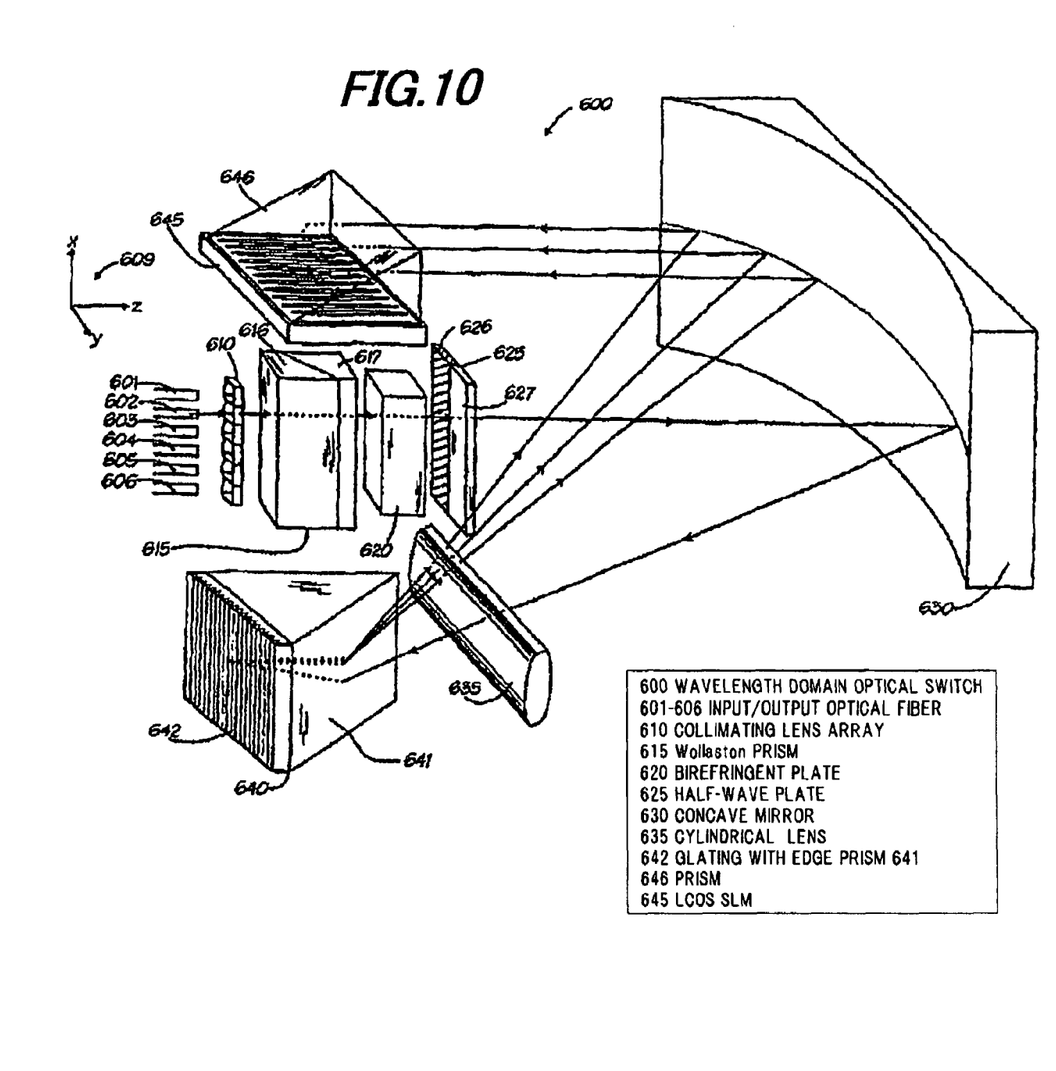
FIG. 10 is a perspective view showing the conventional wavelength domain optical switch.

FIG. 10 shows a conventional wavelength domain optical switch (See US patent publication No. 2006/67611 A1).

As shown in FIG. 10, the wavelength domain optical switch 600 is composed of input/output optical fibers 601 to 606, a collimating lens array 610, a Wollaston prism 615 (composed of two triangular prisms 616, 617) for allowing independence of characteristics between horizontal polarization (y-polarization) and vertical polarization (x-polarization), a birefringent plate 620 for zeroing a phase difference between the horizontal polarization and the vertical polarization, a half-wave plate 625 (where only 626 is a half-wave plate and 627 has no effect on polarization), a concave mirror 630, a cylindrical lens 635, a grating 642 with a wedged prism 641, a prism 646 for bending light in perpendicular direction, and an LCOS SLM (liquid crystal on silicon spatial light modulator).

In the wavelength domain optical switch 600, for example, a wavelength-multiplex beam outputted from the input/output optical fiber 602 is split into two light beams with a same polarization direction, reflected by the concave mirror 630, and inputted to the grating 642. The grating 642 demultiplexes the incident beams into light beams with different wavelengths which are inputted into the LCOS SLM 645. The LCOS SLM 645 conducts a phase modulation such that the light beams with different wavelengths are collected at a position of an optical fiber for outputting them.

Figure 11A:
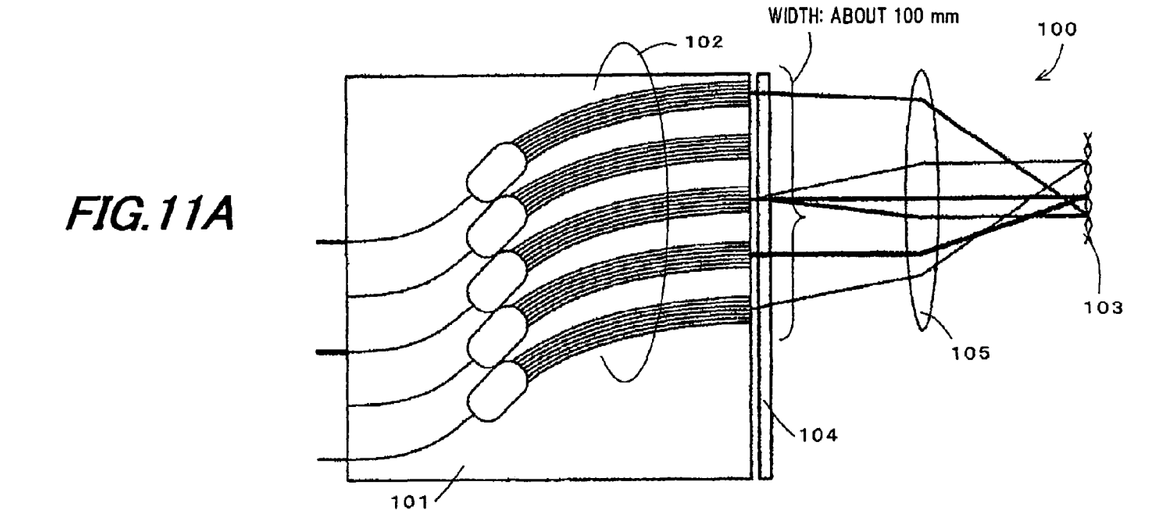
FIG. 11A is a top view thereof and FIG. 11B is a cross sectional view thereof.
Figure 11B:
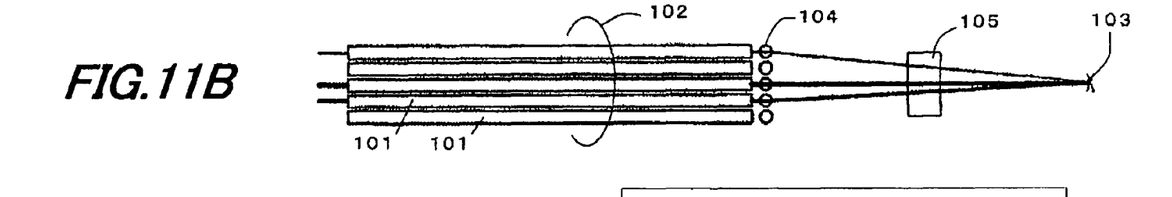

FIGS. 11A and 11B show a conventional waveguide type wavelength selective optical switch using an MEMS (micro electro mechanical system) micro mirror (See U.S. Pat. No. 7,088,882).

As shown in FIGS. 11A and 11B, the waveguide type wavelength selective optical switch 100 is structured such that five waveguide spectrometers 102 are disposed on one substrate 101 and the five substrates 101 are stacked. The waveguide type wavelength selective optical switch 100 allows the MEMS micro mirror 103 to reflect light beam at a predetermined angle. In FIGS. 11A and 11B, 104 is a micro lens array for collecting light beam at respective input/output ends of the waveguide spectrometers 102, and 105 is a collimating lens.

However, the wavelength domain optical switch in FIG. 10 has problems as below.

First, since it uses the bulk grating (i.e., the grating with the wedged prism), it is difficult to decrease the dimensions of the entire grating although only the one component is advantageously needed for demultiplexing.

Second, it needs to use the complicated optical system such as the birefringent plate 620 for zeroing a phase difference between the horizontal polarization (y-polarization) and the vertical polarization (x-polarization), and the half-wave plate 625 (where only 626 is a half-wave plate and 627 has no effect on polarization). This is because it is necessary to eliminate the polarization dependency caused by using the bulk grating with large polarization dependency and the conventional optical phase modulation cell LCOS SLM 645.

Third, in constructing the complicated optical system, the cost of the optical parts used increases along with the assembly cost. Thus, it is difficult to reduce the manufacturing cost.

Fourth, it is difficult to arrange a measure for monitoring a wavelength and power of optical signal which is necessary for the optical network. Therefore, an additional module is newly needed for monitoring.

The waveguide type wavelength selective optical switch using the MEMS micro mirror in FIGS. 11A and 11B has problems as below.

First, although the MEMS micro mirror allows the structure that the plural waveguide spectrometers are in parallel disposed on one substrate due to the large reflection angle of the MEMS mirror, this structure cannot be applied to a wavelength domain optical switch using the LCOS SLM. This is because it is necessary to have a width of 100 mm or so in order to dispose the waveguide type wavelength selective optical switch using the MEMS micro mirror on the substrate. In this case, the LCOS SLM cannot reflect all light beams since it has only a small reflection angle. Thus, such an optical switch must significantly deteriorate in switching performance.

Second, the lens array for collecting light beams in the perpendicular direction disposed corresponding to the respective waveguide spectrometers causes the problems that the assembly time increases since the adjustment of optical axis between the lens array and the respective waveguide spectrometers is very strict to conduct, and that an expensive aspherical lens is needed for reducing aberration in the lens array. These problems become more serious according as the lens decreases in size. Thus, it is very difficult to downsize the optical switch.

Third, since the waveguide spectrometers are horizontally disposed without being inclined to input/output light beam, reflection loss can be caused at the end of the respective optical parts. Therefore, the switching characteristics may lower.

Fourth, where the plural substrates with the waveguide spectrometers are vertically stacked to increase the number of outputs, they cannot be stacked so closely to each other since the micro lens for reducing aberration disposed corresponding to each output is limited in downsizing. Thus, the optical switch is very difficult to downsize for further increasing the number of outputs.

SUMMARY OF THE INVENTION

It is an object of the invention to provide a waveguide type wavelength domain optical switch that can offer a reduced number of parts, simplified assembly and low manufacturing cost.

(1) According to One Embodiment of the Invention, a Waveguide Type Wavelength domain optical switch comprises:

an input/output port comprising at least three waveguide spectrometers stacked in thickness direction;

a first lens for collecting light outputted from an input port of the input/output port in one axis direction;

a second lens for collecting light outputted from the first lens in a direction orthogonal to the collecting direction of the first lens; and an optical phase modulation cell for reflecting light outputted from the second lens through the second lens and the first lens to an output port of the input/output port.

(2) According to Another Embodiment of the Invention, a Waveguide Type Wavelength Domain Optical Switch Comprises:

an input/output port comprising at least two waveguide spectrometers and a waveguide optical coupler circuit stacked in thickness direction;

a first lens for collecting light outputted from an input port of the input/output port in one axis direction;

a second lens for collecting light outputted from the first lens in a direction orthogonal to the collecting direction of the first lens; and an optical phase modulation cell for reflecting light outputted from the second lens through the second lens and the first lens to an output port of the input/output port.

In the above embodiment (1) or (2), the following modifications, changes and a combination thereof can be made.

(i) The stacked waveguide spectrometers are bonded each other by a transparent optical adhesive.

(ii) The stacked waveguide spectrometers and the waveguide optical coupler circuit are bonded each other by a transparent optical adhesive.

(iii) The waveguide optical coupler circuit comprises a slab waveguide, and output waveguides with a number of not less than the number of wavelengths demultiplexed from the slab waveguide.

(iv) The optical switch further comprises:

a light-receiving device at an output end side of the output waveguides for monitoring light outputted from the output waveguides.

(v) The input/output port comprises the input port at a center thereof and the output port above and/or below the input port.

(vi) The waveguide spectrometer comprises an input waveguide comprising a high-refractive index core and a low-refractive index clad, a slab waveguide connected to the input waveguide, and a plurality of array waveguides connected to the slab waveguide and sequentially changed in length.

(vii) The slab waveguide comprises a groove formed thereon, and a resin filled in the grove, the resin comprising a temperature dependency on refractive index opposite to that of silica glass.

(viii) The input/output port comprises an end face with an antireflection coating formed thereon.

(ix) The input/output port comprises an end face inclined by an angle of not less than 8 degrees to a stacking direction of the waveguide spectrometer and to an input/output direction of light in a same plane thereof.

(x) The optical phase modulation cell comprises an end face with an antireflection coating formed thereon.

(xi) The optical phase modulation cell comprises an end face inclined by an angle of 0.1 to 0.5 degrees to light beam outputted from the second lens in a same plane as the waveguide spectrometer.

(xii) The optical phase modulation cell comprises a reflection film and a liquid crystal layer formed on a substrate, and a quarter-wave plate inserted between the reflection film and the liquid crystal layer.

(xiii) The optical phase modulation cell comprises a phase variation distribution applied thereto for compensating a deviation in light collecting position caused by the first lens and the second lens.

BRIEF DESCRIPTION OF THE DRAWINGS

The preferred embodiments according to the invention will be explained below referring to the drawings, wherein:

FIGS. 4A to 4C are diagrams illustrating function and operation of the waveguide type wavelength domain optical switch in FIG. 1, where

FIGS. 11A and 11B are diagrams showing the conventional waveguide type wavelength domain optical switch, where

DETAILED DESCRIPTION OF THE PREFERRED EMBODIMENTS

The preferred embodiments according to the invention will be explained below referring to the drawings.

Figure 1:
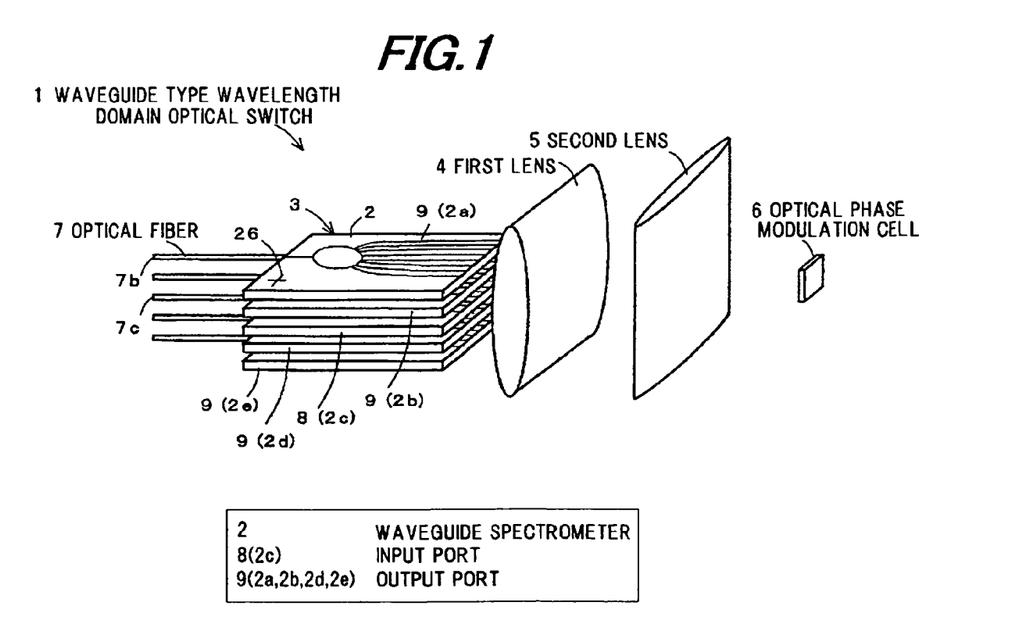
FIG. 1 is a perspective view showing a waveguide type wavelength domain optical switch in a first preferred embodiment according to the invention.

FIG. 1 is a perspective view showing a waveguide type wavelength domain optical switch in the first preferred embodiment according to the invention.

The waveguide type wavelength domain optical switch 1 is composed of an input/output port 3 which is formed by stacking five layers of waveguide spectrometer 2, a first lens 4 for collimating in one axis direction a light beam (where an optical signal propagated in free space is defined as a light beam) being inputted to an optical fiber 7c as an optical transmission line and outputted from an input port 8 of the input/Output port 3, a second lens 5 for collimating the light beam outputted from the first lens 4 in a direction orthogonal to the collimated direction by the first lens 4, and an optical phase modulation cell 6 for inputting the light beam outputted from the second lens 5 through the second lens 5 and the first lens 4 into the arbitrary waveguide spectrometer 2.

In this embodiment, the first lens 4 is disposed such that light beam outputted from the input/output port 3 is collimated in a thickness direction of the waveguide spectrometer 2. The second lens 5 is disposed such that light beam is collimated in a width direction of the waveguide spectrometer 2. The first lens 4 and the second lens 5 are a cylindrical lens. Alternatively, they may be a half cylinder-shaped lens.

The input/output port 3 is connected through an optical transmission line to external system (e.g., an optical transmission system for installing a waveguide type wavelength domain optical switch). In this embodiment, optical fibers 7 (the input optical fiber 7c and an output optical fiber 7b) as an optical transmission line are each connected to the five layers of waveguide spectrometer 2 through one optical fiber block 25 (See FIG. 2A).

The input/output port 3 is composed of the five layers of waveguide spectrometer 2. In this embodiment, a central waveguide spectrometer 2c (the third layer from the top) is used as an input port 8 to which optical signal is inputted from the outside, and the other waveguide spectrometers 2a (or output port 9a), 2b (or output port 9b), 2d (or output port 9d) and 2e (or output port 9e) (the first, second, fourth and fifth layers, respectively, from the top) located above and below the input port 8 are used as an output port 9 from which optical signal is outputted to the outside.

For example, the input/output port 3 is constructed such that the input port 8 is sandwiched between the two output ports 9(2a), 9(2b) and the two output ports 9(2d), 9(2e) vertically aligned, where the input port 8 and the output ports 9 are positioned each other by means of an alignment mark 26 (See FIG. 2A) and are tightly connected through optical adhesives (or adhesive layers). The adhesive layer is preferably about 10 μm or less in thickness. If the thickness of the adhesive layer is beyond 10 μm, the expansion and contraction of the adhesive layer becomes significant along with temperature change, so that the optical characteristics of optical signal propagated through the waveguide spectrometer 2 may vary undesirably.

The waveguide spectrometer 2 will be detailed below.

Figures 2A, 2B:
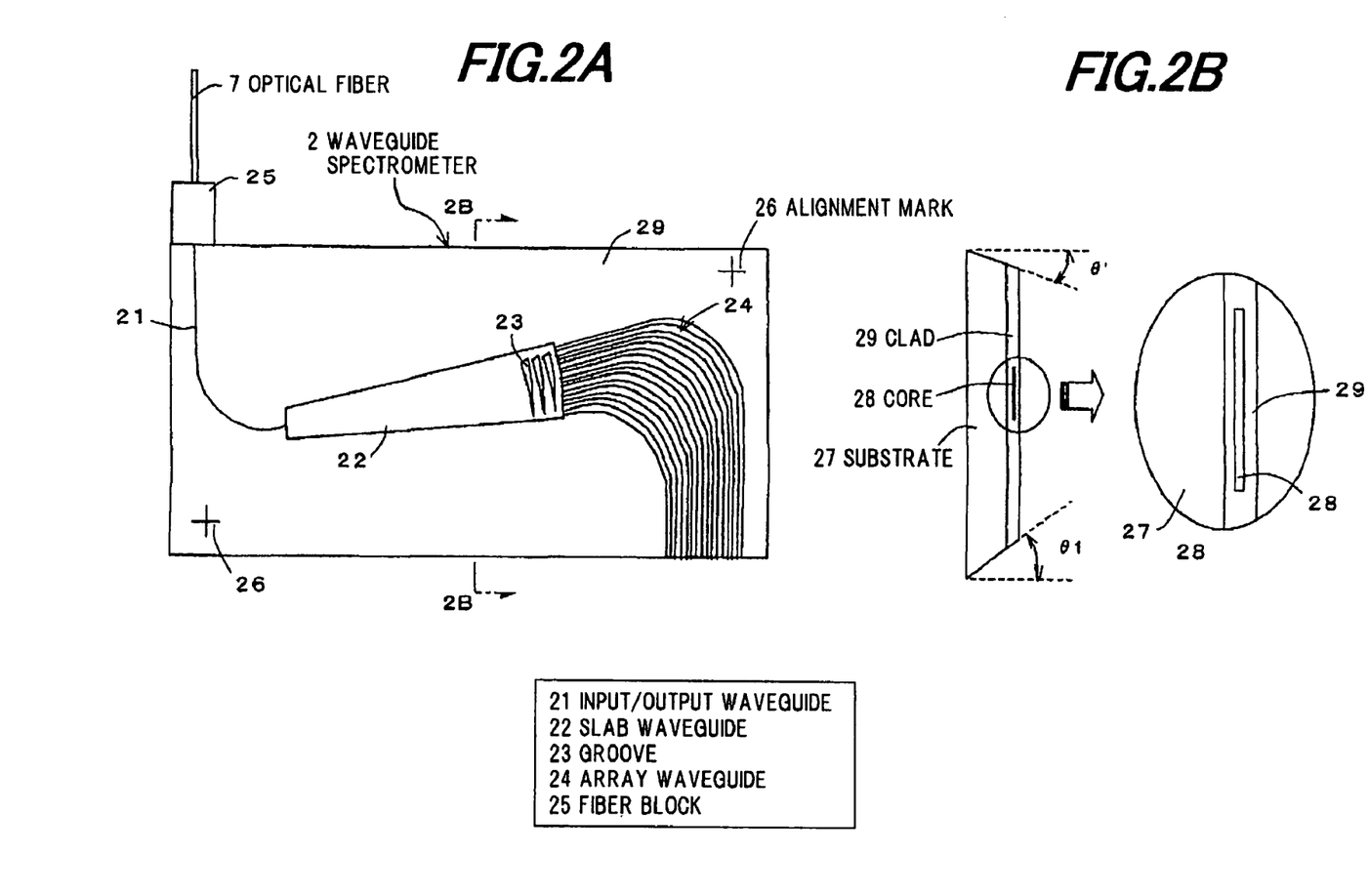
FIG. 2A is a top view showing a waveguide spectrometer in FIG. 1.
FIG. 2B is a cross sectional view cut along a line 2B-2B in FIG. 2A.

As shown in FIG. 2B, the waveguide spectrometer 2 is (in its section) constructed of a silica glass substrate (which may be replaced by a Si substrate) 27, a clad 29 of silica glass, and a core 28 which is surrounded by the clad 29 and has a refractive index greater than the clad 29.

As shown in FIG. 2A, the waveguide spectrometer 2 constructed of the core 28 and the clad 28 is (along its propagation direction) composed of an input/output waveguide 21, a slab waveguide 22 connected to the input/output waveguide 21, and plural array waveguides 22 which are connected to the slab waveguide 22 and different sequentially by a predetermined length. The input/output waveguide 21 is terminated at an end face of the substrate and connected at the end face to the optical fiber 7 through the optical fiber block 25. The plural array waveguides 24 are terminated at an end face opposite to the end face where the input/output waveguide 21 is terminated and faces the first lens 4 at the terminated end face thereof.

The thickness of each waveguide spectrometer 2 is formed preferably 1 mm or less so as to allow the high-density lamination in the thickness direction. By forming thus, polarized light reflected from the optical phase modulation cell 6 can be brought within the thickness of the input/output port 3 with the plural waveguide spectrometers 2 stacked. Therefore, the polarized light can be efficiently inputted to arbitrary waveguide spectrometer 2 of the input/output port 3.

When the Si substrate is used as the substrate 27 of the waveguide spectrometer 2, the alignment adjustment may be conducted using an infrared camera (with near-infrared wavelength of 1.3 μm or more) since the Si substrate is not transparent to visible light.

The silica glass (e.g., additive-doped silica glass and pure silica) composing the waveguide spectrometer 2 varies in refractive index due to heating although the variation is smaller than the other materials. Therefore, in this embodiment, by using the method disclosed by JP patent No. 3498650, a notch-shaped groove 23 (See FIG. 2A) is formed in the slab waveguide 22 so as to eliminate the temperature dependency.

For example, the groove 23 is filled with a resin material that has temperature dependency on refractive index opposite to that of the silica glass. Thereby, an increase (or decrease) in refractive index of the silica glass due to temperature change can be canceled by that of the resin material of the groove 23 due to the temperature change, so that the temperature dependency of the waveguide spectrometer 2 can be eliminated.

In this embodiment, relative to the surface of the substrate of the waveguide spectrometer 2, the end face on the input/output waveguide side is inclined by θ1 and the end face of the array waveguide side is inclined by θ'. The reasons for the inclinations will be described later.

The input/output port 3 may be provided with a dummy substrate 43 (See FIG. 6A) mounted on the uppermost waveguide spectrometer 2a so as to relax stress caused by the lamination of the waveguide spectrometer 2. The dummy substrate 43 need not be provided with a waveguide formed therein and only has to be formed with the same material, thickness and dimensions as the substrate used for the waveguide spectrometer 2.

The optical phase modulation cell 6 will be described below.

Figure 3A:
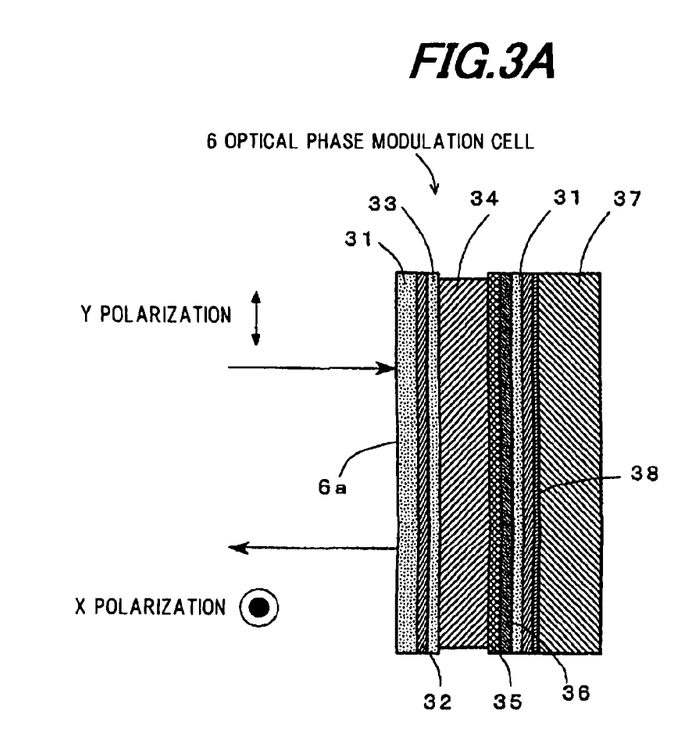
FIG. 3A is a cross sectional view showing an optical phase modulation cell in FIG. 1.
Figure 3B:
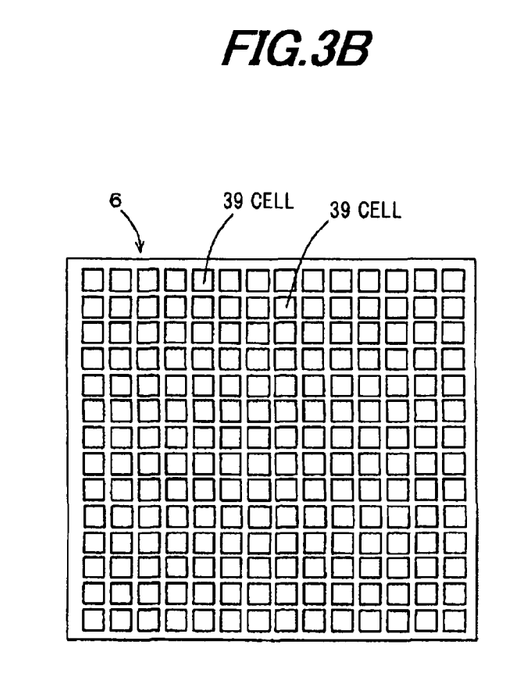
FIG. 3B is a front view showing the optical phase modulation cell in FIG. 1.

As shown in FIG. 3A, the optical phase modulation cell 6 is composed of, sequentially formed on a Si substrate 37 with an electronic circuit formed thereon, a reflection film 38, an electrode (e.g., ITO) 32, a $SiO_2$ film 33, a quarter-wave plate 36, an orientation film 35, a liquid crystal layer 34, a $SiO_2$ film 33, an electrode 32 and a thin glass substrate 31. The quarter-wave plate 36 is a resin thin plate As shown in FIG. 3A, the optical phase modulation cell 6 is (in its top view) composed of a group of cells 39 each of which is independently controllable in refractive index. For example, by applying a voltage to each of the cells 39, the liquid crystal layer 34 can be controlled in light distribution direction (birefringence). Thus, the phase of light beam inputted and reflected at the optical phase modulation cell 6 can be modulated independently by each of the cells 39.

Since the conventional LCOS SLM (optical phase modulation cell) can change only refractive index in one axis direction, only the phase of polarized light in the one axis direction can be changed. For example, when only refractive index in Y-axis direction can be changed, only the phase of polarized light in the Y-axis direction can be changed.

However, in general, light has two polarization components in X-axis direction and Y-axis direction, and the ratio therebetween varies with time. Therefore, the two polarization components in X-axis direction and Y-axis direction need to be phase-controlled in the same way.

The optical phase modulation cell 6 of this embodiment is composed such that the quarter-wave plate 36 is inserted between the reflection film 38 and the liquid crystal layer 34 so as to have an optical path difference of quarter wavelength between the orthogonal polarization components of light propagated through the quarter-wave plate 36. Thus, polarized light in the X-axis direction of light inputted into the optical phase modulation cell 6 is converted into polarized light in the Y-axis direction, and polarized light in the Y-axis direction thereof is converted into polarized light in the X-axis direction. Thus, light beams before the phase conversion (or before reflection) and after the phase conversion (or after reflection) pass through the liquid crystal layer 34 can be equally changed in refractive index of polarization component in the Y-axis direction by the liquid crystal layer 34.

In other words, the polarization component in the Y-axis direction before the phase conversion is phase-converted into the polarized light in the Y-axis direction by the quarter-wave plate 36, and then changed in refractive index by the liquid crystal layer 34. On the other hand, although the polarization component in the Y-axis direction before the phase conversion is changed in refractive index by the liquid crystal layer 34, it is not changed in refractive index by the liquid crystal layer 34 after it is phase-converted into polarized light in the X-axis direction by the quarter-wave plate 36.

The operation of the waveguide type wavelength domain optical switch of this embodiment will be described below.

Wavelength-multiplex optical signal including plural wavelength spectra inputted through the input optical fiber 7c is inputted to the input/output waveguide 21 of the input port 8 (i.e., the central waveguide spectrometer 2c), propagated through the slab waveguide 22 while being radiated in the X-axis direction, and inputted into the plural array waveguides 24. Since the length of the array waveguides 24 is different from each other, a phase difference occurs among optical signals propagated through the array waveguides 24. Then, the optical signals are outputted from the input/output end face of the array waveguides 24 toward the first lens 4. Here, the optical signals with the phase difference interfere with each other so that they are outputted toward the first lens 4 at different angles with respect to wavelength.

The propagation behavior of light beam outputted from the input port 8 will be detailed below referring to FIGS. 4A to 4C.

Figure 4A:
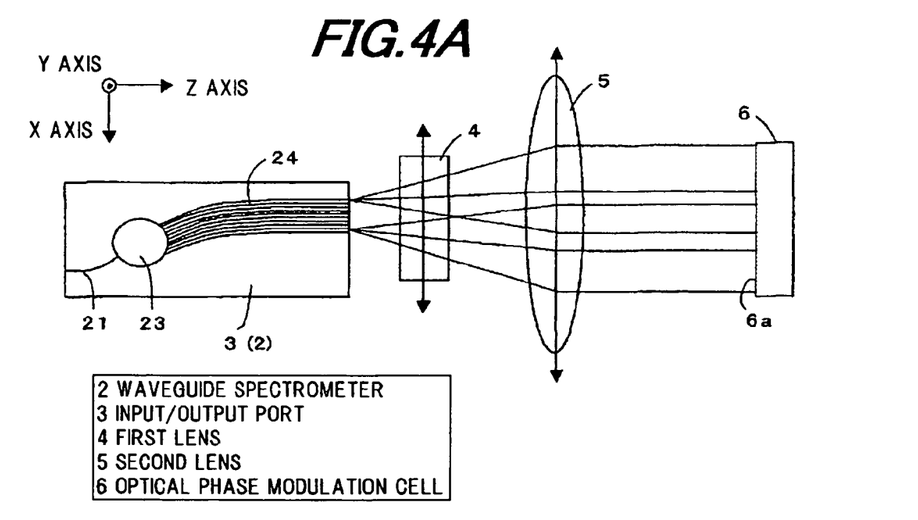
FIG. 4A is a top view thereof.

FIG. 4A shows the propagation behavior of light beam viewed from the top (i.e., viewed in the Y-axis direction) of the waveguide type wavelength domain optical switch 1.

As shown in FIG. 4A, light beam is divided with respect to wavelength and outputted to the first lens 4 while being radiated in the X-axis direction. The light beam inputted into the first lens 4 is thereby collimated with respect to the Y-axis direction without being collimated with respect to the X-axis direction, and outputted to the second lens 5. The light beam inputted into the second lens 5 is thereby collimated with respect to the X-axis direction, and outputted to the optical phase modulation cell 6.

Here, the input/output end face 6a for light beam of the optical phase modulation cell 6 is disposed at angel of 0.1 to 0.5 degrees obliquely relative to the X-axis direction so as to reduce reflection loss in the input/output of light beam.

The reasons for disposing the optical phase modulation cell 6 obliquely to the X-axis direction will be explained below.

In general, if the spot size of light is large, large optical connection loss occurs when the incident angle of light is deviated even a little, although optical connection loss occurs little when the incident position is deviated.

On the other hand, if the spot size of light is small, large optical connection loss occurs when the incident position of light is deviated even a little, although optical connection loss occurs little when the incident angle is deviated.

In this embodiment, the deflection angle of light beam by the optical phase modulation cell 6 cannot be taken so much as described later, the optical phase modulation cell 6 is preferably disposed obliquely relative to a direction with a large light spot size, i.e., the X-axis direction (in this embodiment, light beam outputted from the array waveguide 24 is shaped like an ellipse with a major axis in the X-axis direction). Thereby, loss can be prevented which is caused by interference between light inputted to the optical phase modulation cell 6 and light reflected back at the input/output end face 6a.

The reasons for determining the oblique angle in the range of 0.1 to 0.5 degrees are as follows. If the oblique angle is set beyond 0.5 degrees, light beam may not be inputted to the output port 9 (2a, 2b, 2d and 2e) since the deflection angle of the optical phase modulation cell 6 cannot be taken so much. If the oblique angle is set less than 0.1 degree, it may not have most the effects by inclining the input/output end face 6a of the optical phase modulation cell 6 relative to the X-axis direction.

Figure 4B:
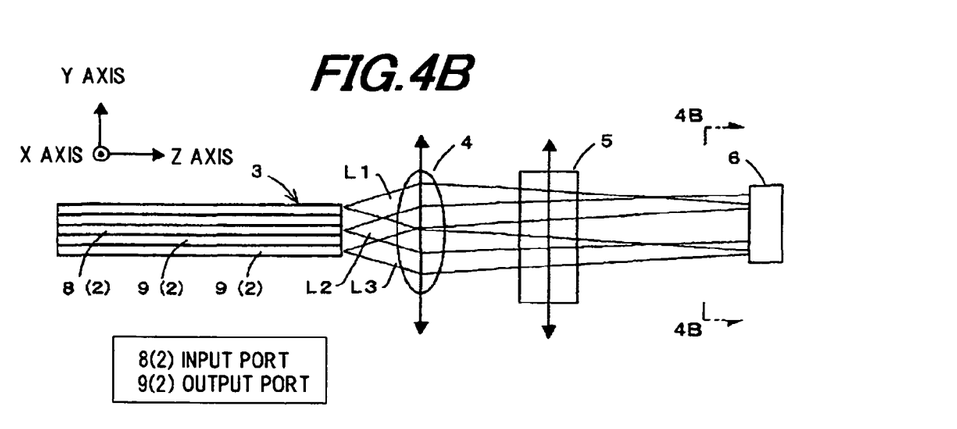
FIG. 4B is a side view thereof.

FIG. 4B shows the propagation behavior of light beam viewed from the lateral direction (X-axis direction).

As shown in FIG. 4B, light beam inputted into the first lens 4 from the input/output end face of the input port 8 is thereby collimated with respect to the Y-axis direction without being collimated with respect to the X-axis direction, and outputted to the second lens 5. The light beam inputted into the second lens 5 is thereby collimated with respect to the X-axis direction without being collimated with respect to the Y-axis direction, and outputted to the optical phase modulation cell 6.

Figure 4C:
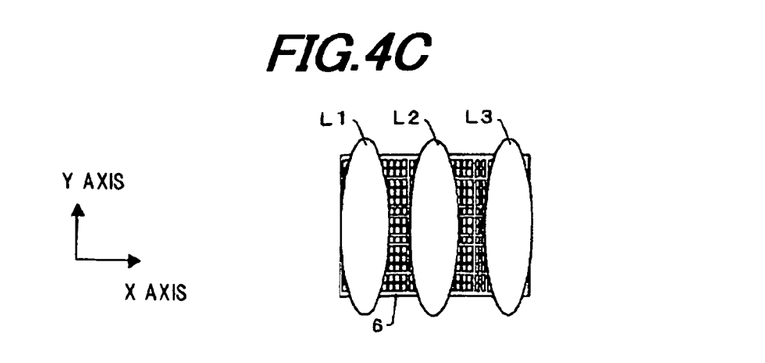
FIG. 4C is a view in a direction of line and arrows 4B-4B in FIG. 4B.

As shown in FIG. 4C, the light beam inputted to the optical phase modulation cell 6 is divided with respect to wavelength, so that the divided light beam of each wavelength is inputted to a different region (i.e., different cell) of the optical phase modulation cell 6 (as shown by L1, L2 and L3 in FIG. 4C, wherein, as described earlier, light beam just after being outputted from the array waveguide 24 is shaped like an ellipse with a major axis in the X-axis direction and, however, after being outputted from the array waveguide 24, due to the Fourier transformation by the first lens 4 and the second lens 5, it forms an image shaped like an ellipse with a major axis in the Y-axis direction on the optical phase modulation cell 6). The light beams inputted to the optical phase modulation cell 6 are phase-converted at each cell in the optical phase modulation cell 6, polarized in the vertical direction (Y-axis direction), and returned toward the input/output port 3. In the meanwhile, the returned light beam is collimated in the X-axis direction by the second lens 5, collimated in the Y-axis direction by the first lens 4, and inputted to the input/output port 3.

The light beam returned to the input/output port 3 is controlled in refractive index at each cell in the optical phase modulation cell 6, and therefore reflected at a predetermined polarization angle with respect to wavelength so that the output port 9 to input the reflected light beam can be selected with respect to wavelength. The light beam (optical signal) inputted to each output port 9 (waveguide spectrometer 2) is multiplexed (or collected) in each output port 9, and outputted as wavelength-demultiplexing optical signal to the output optical fiber 7c.

Figure 5A:
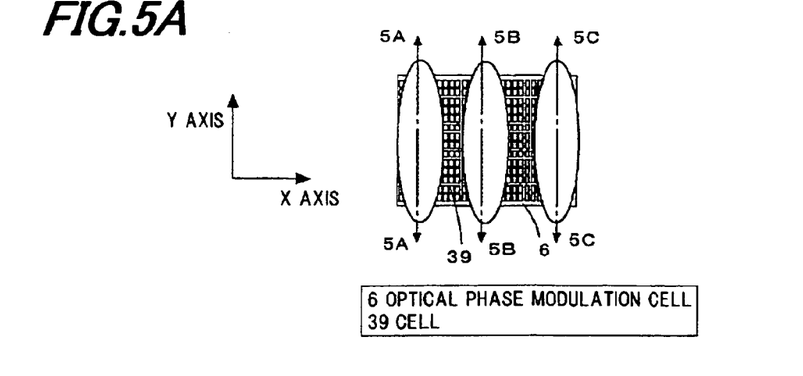
FIG. 5A is a view in a direction of line and arrows 4B-4B in FIG. 4B.
Figure 5B:
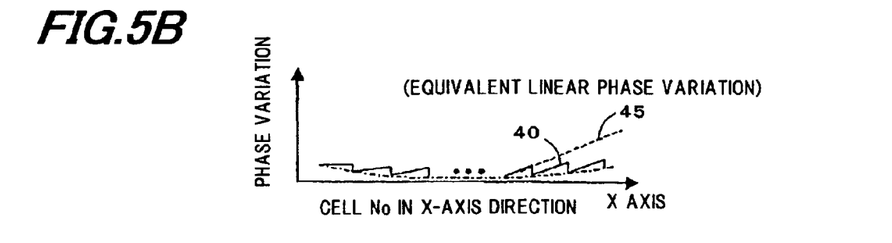
FIG. 5B is a graph showing a phase variation distribution in an X-axis direction of the optical phase modulation cell.
Figure 5C:
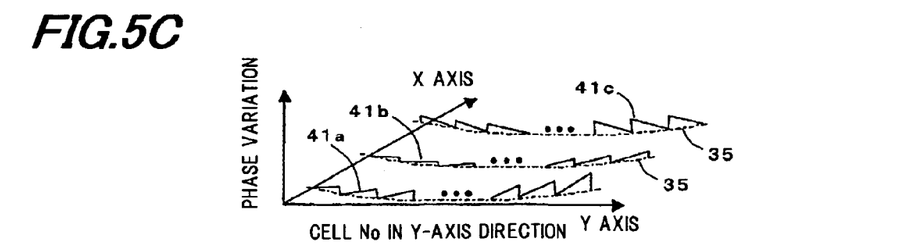
FIG. 5C is a graph showing a phase variation distribution of the optical phase modulation cell.

FIGS. 5A to 5C show an example of phase variation applied to light beam inputted to the optical phase modulation cell 6.

The phase variation required to reflect the light beam inputted to each cell 39 of the optical phase modulation cell 6 is about $2\pi$ at the maximum. Therefore, as shown in FIG. 5B, for cells arranged in the X-axis direction, the phase variation applied to light beam is set to be not more than $2\pi$ and to have a saw-tooth distribution 40 equivalent to a linear phase variation as shown by a dashed line in FIG. 5B.

In general, at a position away from the center portion of a lens, ideal collection of light cannot be obtained and an aberration occurs. Therefore, as shown in FIG. 5C, a parabolic (in FIG. 5C, 35: forming a parabola without saw-tooth phase variation applied to) phase variation is applied to light beam by changing a voltage applied to each cell 39 of the optical phase modulation cell 6 so as to compensate a deviation in light collection caused by the aberration of the first lens 4 and the second lens 5.

Although three distributions 41a, 41b and 41c are exemplarily shown in FIG. 5C, they only illustrate distributions on a line 5A-5A, a line 5B-5B and a line 5C-5C in FIG. 5A. In fact, over the entire optical phase modulation cell 6, the phase variation forms a two-dimensional distribution.

Figure 5D:
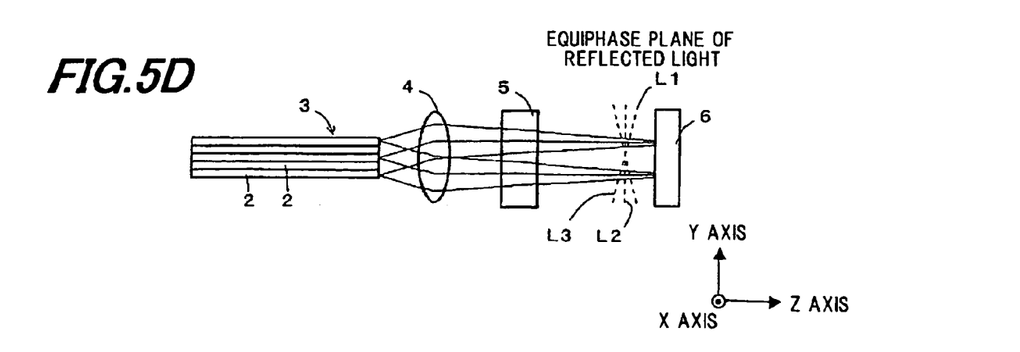
FIG. 5D is a side view showing the waveguide type wavelength domain optical switch.

When the distribution of phase variation as shown in FIG. 5B is applied to the optical phase modulation cell 6, the phase of light beam with each wavelength in the Y-axis direction is changed such that light output angles from the optical phase modulation cell 6 are different from each other. In other words, as shown in FIG. 5D, equiphase planes (L1, L2 and L3) of light beam reflected by the optical phase modulation cell 6 and propagated in free space are different with respect to wavelength. Thereby, light beam with a predetermined wavelength can be inputted to the desired waveguide spectrometer 2 of the output port 9.

In general, when light beam is inputted into free space from an optical waveguide or into an optical waveguide from free space, reflection loss (back reflection light) occurs.

Figure 6A:
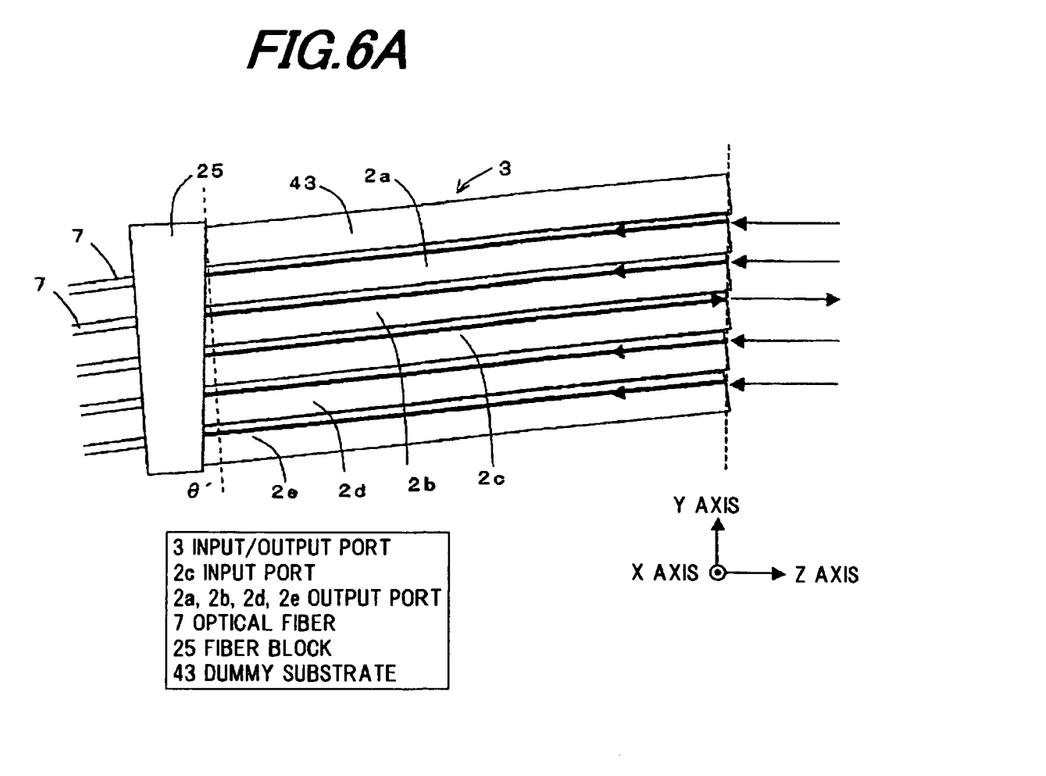
FIG. 6A is a cross sectional view showing an input/output port in FIG. 1.
Figure 6B:
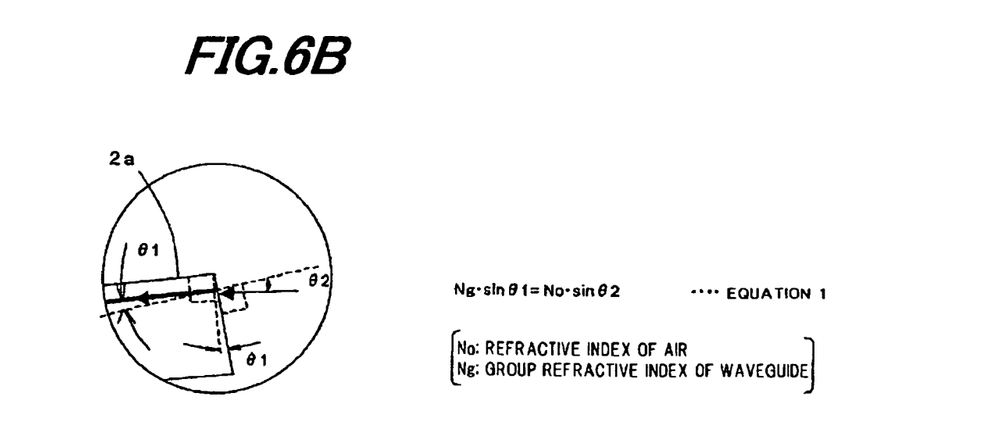
FIG. 6B is an enlarged view showing a main part in FIG. 6A.

Thus, in this embodiment, as shown in FIGS. 6A and 6B, the end faces are inclined by angle θ1 of 8 degrees or more relative to the lamination direction (i.e., the Y-axis direction) of the waveguide spectrometer 2 so as to prevent reflection loss occurred when light beam is outputted from the input port 8 or when light beam is inputted to the output port 9. Provided that the inclination angle of the end face is θ1, light beam is outputted or inputted at angle θ2 calculated by equation 1:

$$Ng \times \sin θ1 = No \times \sin θ2 \quad \text{[equation 1]}$$

where Ng=a group refractive index of the waveguide spectrometer, and No=a refractive index of the air.

Thus, where the waveguide spectrometer 2 is disposed to form an angle θ2 relative to a direction (i.e., Z-axis direction) perpendicular to the lamination direction of the waveguide spectrometer 2, light beam propagated in free space can be parallel to the Z-axis direction.

In this embodiment, the inclination angle of the end face of the waveguide spectrometer 2 where the waveguide spectrometer 2 contacts the fiber block 25 is set to be θ' so as to facilitate the assembly (See FIG. 6A). In this regard, since no problem occurs if life beam outputted from the waveguide spectrometer 2 forms parallel light, the angle of the end face of the fiber block 25 and the inclination angle θ' can be set arbitrarily.

As described above, the waveguide type wavelength domain optical switch 1 of this embodiment is constructed such that the optical phase modulation cell (LCOS SLM) 6 is used in place of the Wollaston prism, which requires the expensive and complicated optical system, and the input/output port 3 is formed by stacking the three or more waveguide spectrometers 2. Thereby, the number of assembly optical parts can be reduced. Thus, the optical switch can be very simplified in composition, so that the parts cost can be significantly reduced and the assembly cost can be reduced as well.

The optical phase modulation cell 6 of this embodiment has the quarter-wave plate 36 inserted between the liquid crystal layer 34 and the reflection film 38. Thereby, the horizontal polarization (X-axis polarization) is converted into the vertical polarization (Y-axis polarization) or the vertical polarization (Y-axis polarization) is converted into the horizontal polarization (X-axis polarization). Thus, by the cancellation therebetween, any characteristic change caused by the polarization can be eliminated. Therefore, the polarization dependent loss can be reduced without using the Wollaston prism so as to have an optical switch system that can be significantly downsized and low-cost.

Figure 9:
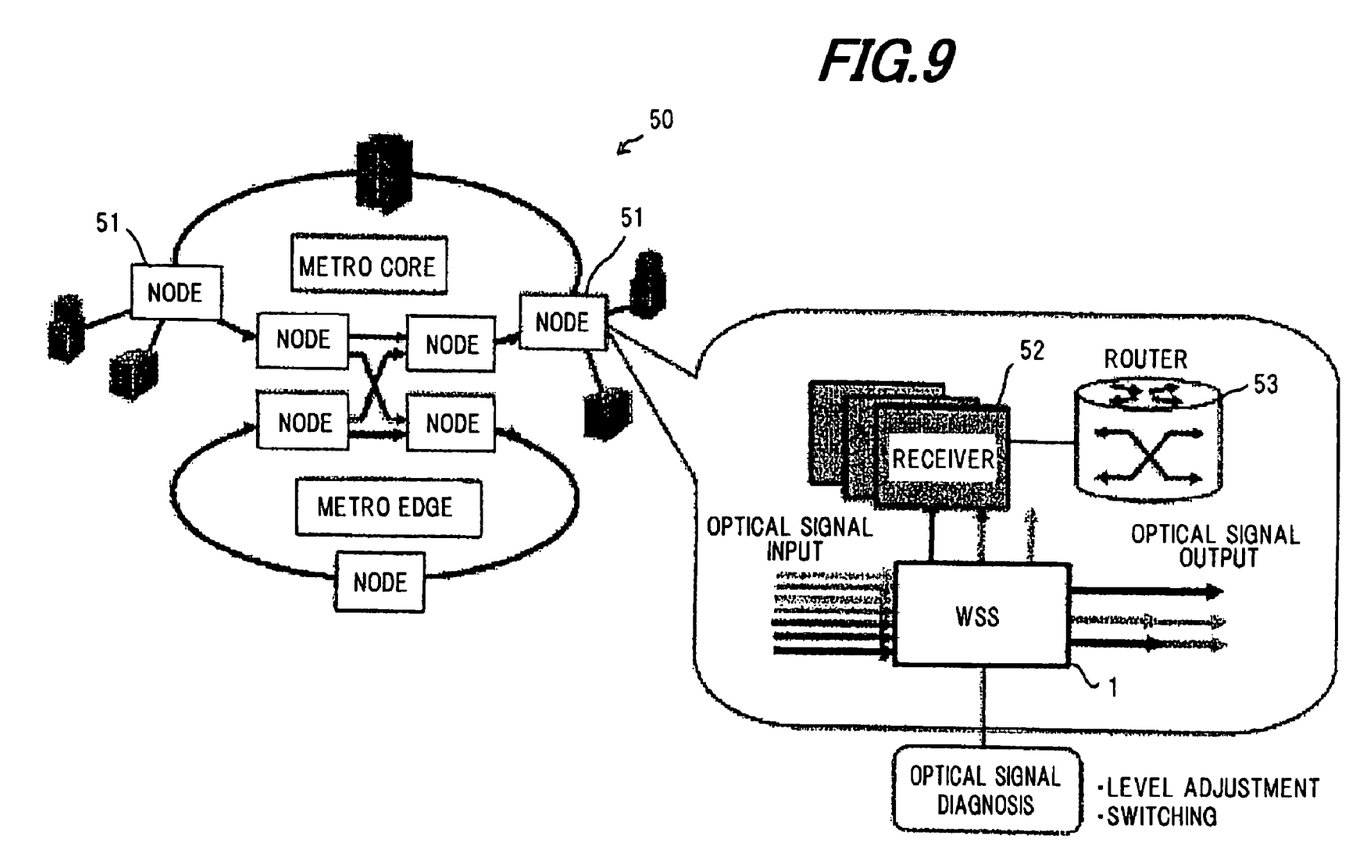
FIG. 9 is a diagram illustrating an optical system using a waveguide type wavelength domain optical switch of the invention.

FIG. 9 shows an example of an optical system using the waveguide type wavelength domain optical switch of this embodiment.

As shown in FIG. 9, the waveguide type wavelength domain optical switch 1 (indicated by WSS (=wavelength-selective switch)) is used for each node 51 of an optical network system 50 (e.g., a wavelength access network system).

When a multiplex optical signal is transmitted to the node 51 with the WSS 1, optical signal with a predetermined wavelength passes through the WSS1 and is then transmitted to another node. On the other hand, optical signal with the other wavelength is divided, received by a receiver 52, changed in signal path by a router 53, and transmitted to another network or apparatus.

The waveguide type wavelength domain optical switch 1 of this embodiment can be also applied to optical cross connect system as well as a division/insertion (optical Add/Drop) system of optical signal. At present, waveguide type wavelength domain optical switches are used for a relatively large-scale system such as a backbone or metro-core system. However, since the optical switch of this embodiment can be made significantly low-cost, it can be also applied to a metro-edge or access system so as to contribute to innovative development of optical network.

In this embodiment, the optical phase modulation cell 6 is disposed obliquely to the input/output end face of the waveguide spectrometer 2. Alternatively, antireflection coating may be formed on the input/output end face such that the optical phase modulation cell 6 is disposed to allow light beam to be inputted perpendicularly to the end face.

In this embodiment, the input/output port 3 is composed of the five stacked waveguide spectrometers 2 (one for the input port and four for the output port). However, the number of the waveguide spectrometer 2 may be at least three (e.g., one for the input port and two for the output ports disposed above and below the input port). Thus, the number of the waveguide spectrometer 2 can be changed according to performance required for an optical system to install the waveguide type wavelength domain optical switch 1.

In this embodiment, of the stacked waveguide spectrometers 2, the central waveguide spectrometer 2c is used as the input port 8. Alternatively, the input port 8 may be assigned to any waveguide spectrometer 2 located at the upper or lower side of the input/output port 3. However, since the diffraction angle (or polarization angle) of the optical phase modulation cell 6 is limited, the central waveguide spectrometer 2c is preferably used as the input port 8 when there are provided many waveguide spectrometers 2 for switching many wavelength optical signals.

In this embodiment, a Drop port is exemplified where the input/output port 3 is composed of the one input port 8 and the plural output ports 9 and a wavelength-multiplex optical signal is demultiplexed and outputted to another waveguide spectrometer. Alternatively, an Add port may be made where its input/output port is composed of plural input ports and one output port and plural wavelength lights are multiplexed and inputted to a waveguide spectrometer. Further, an Add/Drop port may be made such that its input/output port is composed of plural input ports and plural output ports.

The second preferred embodiment of the invention will be described below.

Figure 7:
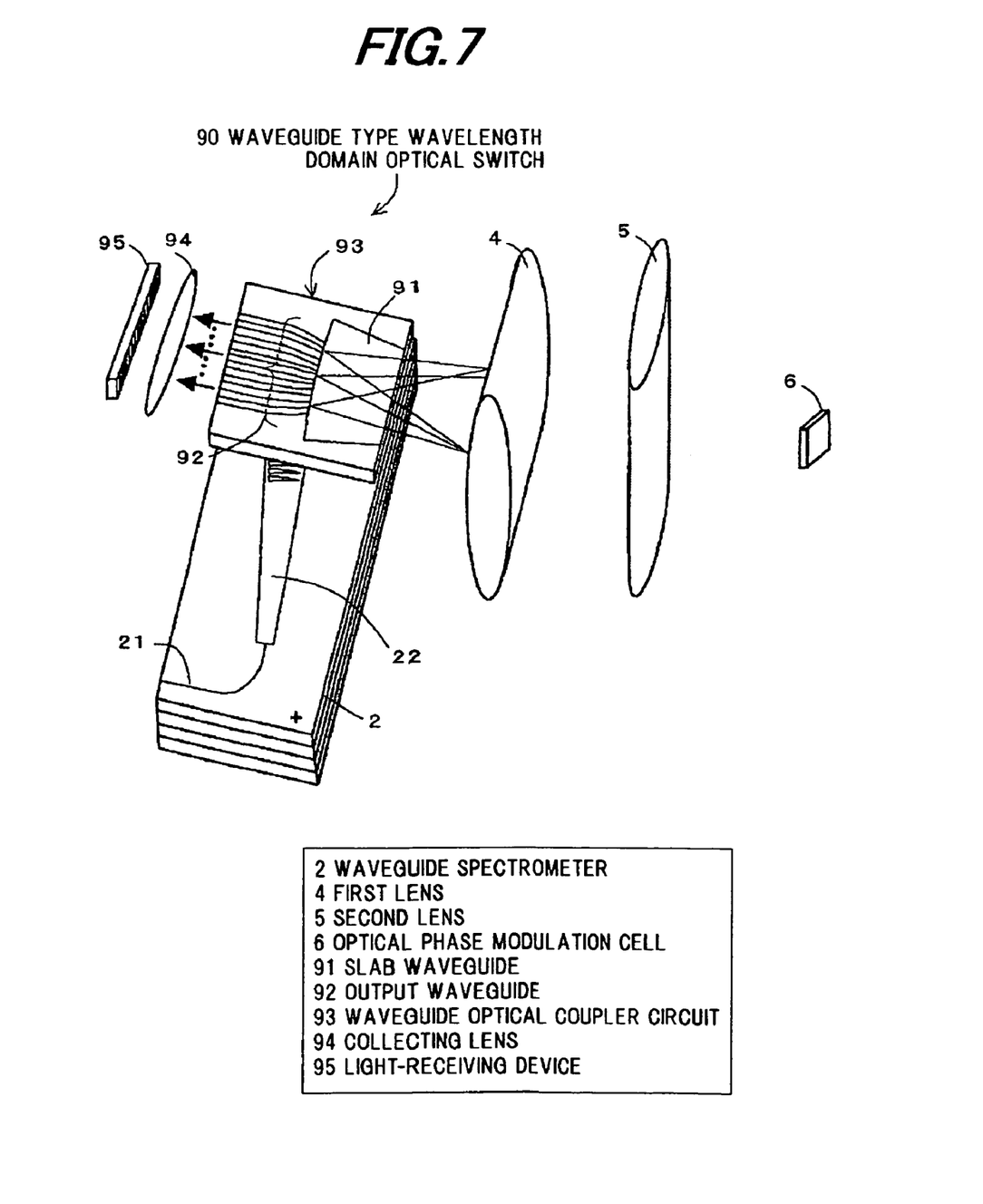
FIG. 7 is a perspective view showing a waveguide type wavelength domain optical switch in a second preferred embodiment according to the invention.

FIG. 7 is a perspective view showing a waveguide type wavelength domain optical switch in the second preferred embodiment according to the invention.

As shown in FIG. 7, the waveguide type wavelength domain optical switch 90 of this embodiment is in main composition the same as that of the first embodiment as described above. However, this embodiment is different in that the upper most waveguide spectrometer 2a of the input/output port 3 as shown in FIG. 1 is replaced by a waveguide optical coupler circuit 93. Meanwhile, optical fibers (not shown) are connected only to the waveguide spectrometer 2.

The waveguide optical coupler circuit 93 is composed of, formed on a substrate, a slab waveguide 91 and an output waveguide 92 which is connected to the slab waveguide 91 and has waveguides more than the number of demultiplexed wavelengths. The slab waveguide 91 has an input end formed on the end face of the substrate facing the first lens 4. In other words, the input end of the slab waveguide 91 is formed above the input/output end face of the array waveguide 24 of the waveguide spectrometer 2. The output waveguide 92 has an output end formed on end face of the substrate opposite the input end of the slab waveguide 91. On the side of the output end, there are provided a light-receiving device 95 for receiving light beam outputted from the output waveguide 92 and a collecting lens 94 for collecting the light beam to the light-receiving device 95.

The waveguide type wavelength domain optical switch 90 of this embodiment has the same function as that of the first embodiment in that it demultiplexes a wavelength-multiplex optical signal being inputted to the input port 8 and the demultiplexed wavelength optical signals are each outputted through a predetermined output port.

However, this embodiment is different from the first embodiment in phase variation applied to the optical phase modulation cell 6.

Figure 8A:
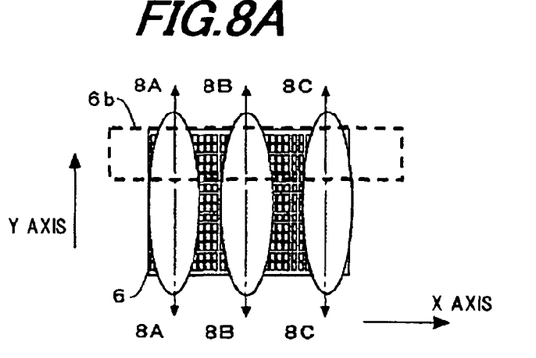
FIG. 8A is a front view showing an optical phase modulation cell in FIG. 7.
Figure 8B:
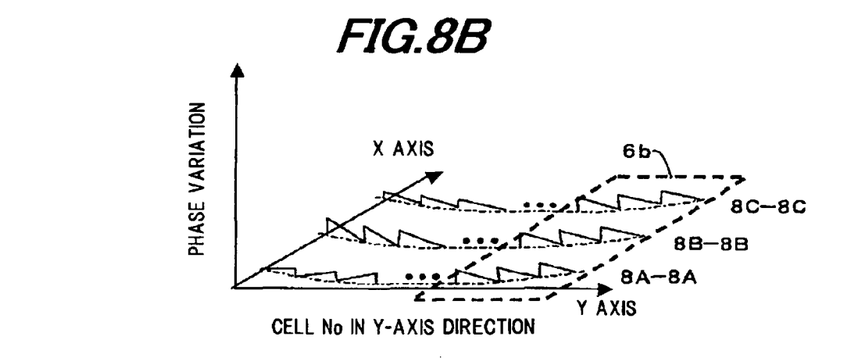
FIG. 8B is a graph showing a phase variation distribution of the optical phase modulation cell in FIG. 8A.

In this embodiment, as shown in FIG. 8A, cells in region 6a surrounded by dashed lines are applied a predetermined voltage such that an inclination of phase is determined which allows light beam to be inputted to the end face of the waveguide optical coupler circuit 93. Thus, as shown in FIG. 8B, the same phase variation can be applied to light beam being inputted to the cells in region 6b. For example, voltage applied to the cells in region 6b surrounded by the dashed lines is set such that, in light beam of all wavelengths demultiplexed, about 10% of optical power inputted to the optical phase modulation cell 6 can be inputted to the end face of the waveguide optical coupler circuit 93.

Figure 8C:
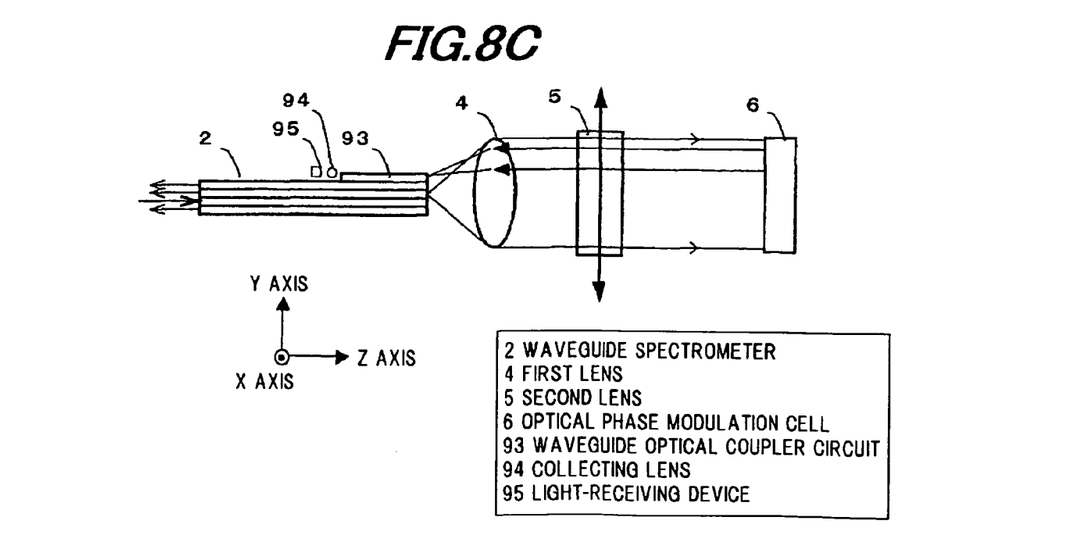
FIG. 8C is a side view showing the waveguide type wavelength domain optical switch in FIG. 7.

As shown in FIG. 8C, light reflected at region 6b is propagated through the second lens 5 and the first lens 4 and inputted to the waveguide optical coupler circuit 93.

Then, optical signal inputted to the slab waveguide 91 of the waveguide optical coupler circuit 93 is outputted with respect to each wavelength from the output waveguide 92. Then, light outputted from each output waveguide 92 passes through the collecting lens 94 and is received by the light-receiving array 95. Thus, the demultiplexed wavelength and power can be monitored.

The other cells 39 than those in region 6b surrounded by the dashed lines are used as a wavelength switch to which a phase variation is applied so as to input light beam to the output port 9 as in the first embodiment.

In this embodiment, the waveguide spectrometer 2a as a part of the output port 9 of the waveguide type wavelength domain optical switch 1 in FIG. 1 is replaced by the waveguide optical coupler circuit 93. Thereby, the monitoring function for detecting power of optical signal in each wavelength can be obtained as well as the wavelength switching function. Thus, the flexibility of the wavelength domain optical switch can be significantly enhanced.

Especially, the optical network as shown in FIG. 9 needs the function for monitoring which wavelength and how much power is transmitted at each node. In accordance with this embodiment, the waveguide type wavelength domain optical switch 90 can be formed by stacking the waveguide optical coupler circuit 93 on the waveguide spectrometer 2 so as to monitor such wavelength and power.

Other than this embodiment, the optical switch of the invention may be equipped with various flexible functions such as light distribution.

According to the above embodiments, the waveguide type wavelength domain optical switch can be realized which is low-cost, downsized and provides for high-performance and flexibility.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A waveguide type wavelength domain optical switch, comprising:
   an input/output port comprising at least three waveguide spectrometers stacked in thickness direction;
   a first lens for collecting light outputted from an input port of the input/output port in one axis direction, said first lens comprises a single lens;
   a second lens for collecting light outputted from the first lens in a direction orthogonal to the collecting direction of the first lens; and
   an optical phase modulation cell for reflecting light outputted from the second lens through the second lens and the first lens to an output port of the input/output port.

2. The waveguide type wavelength domain optical switch according to claim 1, wherein the stacked waveguide spectrometers are bonded to each other by a transparent optical adhesive.

3. A waveguide type wavelength domain optical switch, comprising:
   an input/output port comprising at least two waveguide spectrometers and a waveguide optical coupler circuit stacked in thickness direction;
   a first lens for collecting light outputted from an input port of the input/output port in one axis direction;
   a second lens for collecting light outputted from the first lens in a direction orthogonal to the collecting direction of the first lens; and
   an optical phase modulation cell for reflecting light outputted from the second lens through the second lens and the first lens to an output port of the input/output port.

4. The waveguide type wavelength domain optical switch according to claim 3, wherein the stacked waveguide spectrometers and the waveguide optical coupler circuit are bonded to each other by a transparent optical adhesive.

5. The waveguide type wavelength domain optical switch according to claim 4, wherein the waveguide optical coupler circuit comprises a slab waveguide, and output waveguides with a number of not less than the number of wavelengths demultiplexed from the slab waveguide.

6. The waveguide type wavelength domain optical switch according to claim 5, further comprising:
a light-receiving device at an output end side of the output waveguides for monitoring light outputted from the output waveguides.

7. The waveguide type wavelength domain optical switch according to claim 1, wherein the input/output port comprises an input port at a center thereof and an output port formed at least one of above and below the input port.

8. The waveguide type wavelength domain optical switch according to claim 1, wherein the waveguide spectrometer comprises an input waveguide comprising a high-refractive index core and a low-refractive index-clad, a slab waveguide connected to the input waveguide, and a plurality of array waveguides connected to the slab waveguide and sequentially changed in length.

9. The waveguide type wavelength domain optical switch according to claim 8, wherein the slab waveguide comprises a groove formed thereon, and a resin filled in the grove, the resin comprising a temperature dependency on a refractive index opposite to that of silica glass.

10. The waveguide type wavelength domain optical switch according to claim 1, wherein the input/output port comprises an end face with an antireflection coating formed thereon.

11. The waveguide type wavelength domain optical switch according to claim 1, wherein the input/output port comprises an end face inclined by an angle of not less than 8 degrees to a stacking direction of the waveguide spectrometer and to an input/output direction of light in a same plane thereof.

12. The waveguide type wavelength domain optical switch according to claim 1, wherein the optical phase modulation cell comprises an end face with an antireflection coating formed thereon.

13. The waveguide type wavelength domain optical switch according to claim 1, wherein the optical phase modulation cell comprises an end face inclined by an angle of 0.1 to 0.5 degrees to a light beam outputted from the second lens in a same plane as the waveguide spectrometer.

14. The waveguide type wavelength domain optical switch according to claim 1, wherein the optical phase modulation cell comprises a reflection film and a liquid crystal layer formed on a substrate, and a quarter-wave plate inserted between the reflection film and the liquid crystal layer.

15. The waveguide type wavelength domain optical switch according to claim 1, wherein the optical phase modulation cell comprises a phase variation distribution applied thereto for compensating a deviation in a light collecting position caused by the first lens and the second lens.

16. The waveguide type wavelength domain optical switch according to claim 1, wherein the first lens, rather than a lens array, is formed between the input/output port and said second lens.

17. The waveguide type wavelength domain optical switch according to claim 1, wherein the light outputted from said input port and said reflecting light pass through the single lens of the first lens.

18. The waveguide type wavelength domain optical switch according to claim 1, wherein said optical phase modulation cell comprises a quarter-wave plate comprising a resin thin plate, and
wherein polarized light in the thickness direction of light inputted into the optical phase modulation cell is converted into polarized light in said one axis direction, and polarized light in said one axis direction is converted into polarized light in the thickness direction.

19. The waveguide type wavelength domain optical switch according to claim 1, wherein said single lens is not part of a lens array.

20. A waveguide type wavelength domain optical switch, comprising:
an input/output port comprising at least three waveguide spectrometers stacked over each other;
a single-piece first lens for collecting light outputted from an input port of the input/output port;
a second lens for collecting light outputted from the single-piece first lens; and
an optical phase modulation cell, comprising a quarter-wave plate having a resin thin plate, for reflecting light outputted from the second lens through the second lens and the single piece-first lens to an output port of the input/output port.

* * * * *